United States Patent
Cooper

(10) Patent No.: US 6,473,940 B1
(45) Date of Patent: Nov. 5, 2002

(54) KNOB FOR A POST VALVE

(75) Inventor: Devin Glenn Cooper, Fairport, NY (US)

(73) Assignee: Harsco Technologies Corporation, Fairmont, MN (US)

( * ) Notice: Subject to any disclaimer, the term of this patent is extended or adjusted under 35 U.S.C. 154(b) by 0 days.

(21) Appl. No.: 09/896,688

(22) Filed: Jun. 29, 2001

(51) Int. Cl.[7] .............. G05G 1/10; B25G 1/04; B25G 3/00; F16K 31/52

(52) U.S. Cl. .............. 16/441; 251/293; 74/553; 74/554; 74/556; 16/433; 81/177.6; 81/177.7; 81/177.8

(58) Field of Search .............. 16/441, 433, 436; 251/293; 74/553–556; 81/177.1, 177.6–177.9

(56) References Cited

U.S. PATENT DOCUMENTS

| | | | | |
|---|---|---|---|---|
| 2,171,361 A | * | 8/1939 | Gits et al. ............. | 16/422 |
| 3,396,604 A | * | 8/1968 | Samuels et al. ........ | 16/441 |
| 3,541,882 A | * | 11/1970 | Testa ................... | 16/441 |
| 3,762,086 A | * | 10/1973 | Horbinski ............. | 16/441 |
| 3,808,635 A | * | 5/1974 | Moran et al. .......... | 16/441 |
| 4,065,216 A | * | 12/1977 | Nelson ................. | 16/441 |
| 4,222,062 A | * | 9/1980 | Trotter et al. ......... | 148/DIG. 168 |
| 4,571,111 A | * | 2/1986 | Keogh ................. | 16/433 |
| 4,893,392 A | * | 1/1990 | Stricker et al. ........ | 16/422 |
| D314,904 S | | 2/1991 | Trinkwalder, Jr. ..... | D8/312 |
| 5,584,098 A | * | 12/1996 | Koyama et al. ........ | 16/441 |
| 5,762,278 A | * | 6/1998 | Yamaguchi et al. .... | 16/422 |
| 5,765,449 A | * | 6/1998 | LeMire ................ | 16/441 |
| 5,857,242 A | * | 1/1999 | Pizzo et al. ........... | 16/441 |
| 5,893,298 A | * | 4/1999 | Keister ................ | 74/553 |
| 5,947,671 A | * | 9/1999 | Kanaan et al. ........ | 74/553 |
| 6,095,018 A | * | 8/2000 | Schuster .............. | 81/177.5 |
| 6,148,841 A | | 11/2000 | Davidson ............. | 137/68.23 |

OTHER PUBLICATIONS

Photos—Attachment 1A, 1B, 1C, 2A, 2B, 2C, 2D, 3, 4A, 4B, 5, 6A, 6C, 7, 8, 9, 10A, 10B, 10C, 11A, 11B.

* cited by examiner

*Primary Examiner*—Robert E. Pezzuto
*Assistant Examiner*—Tara L. Mayo
(74) *Attorney, Agent, or Firm*—David C. Jenkins; Eckert Seamans Cherin & Mellott, LLC

(57) ABSTRACT

A knob for a medical post valve, the post valve having a threaded bonnet with a diameter, and a valve stem, the valve stem having an external end shaped, generally, as a cylinder with two opposing flat sides, the knob comprising a hub having an elongated body with a diameter that is generally the same size as the bonnet diameter, the body having a first end, a second end, and an axial cavity, the first end having a medial slot extending in across the first end in a direction perpendicular to the cavity, an elongated handle, the handle sized to fit within the cavity, the handle movable between a first position and a second position, the handle first position being disposed within such cavity with the axis of the handle generally aligned with the axis of the body, and the handle second position being disposed within the slot with the axis of the handle extending perpendicular to the axis of the body.

20 Claims, 4 Drawing Sheets

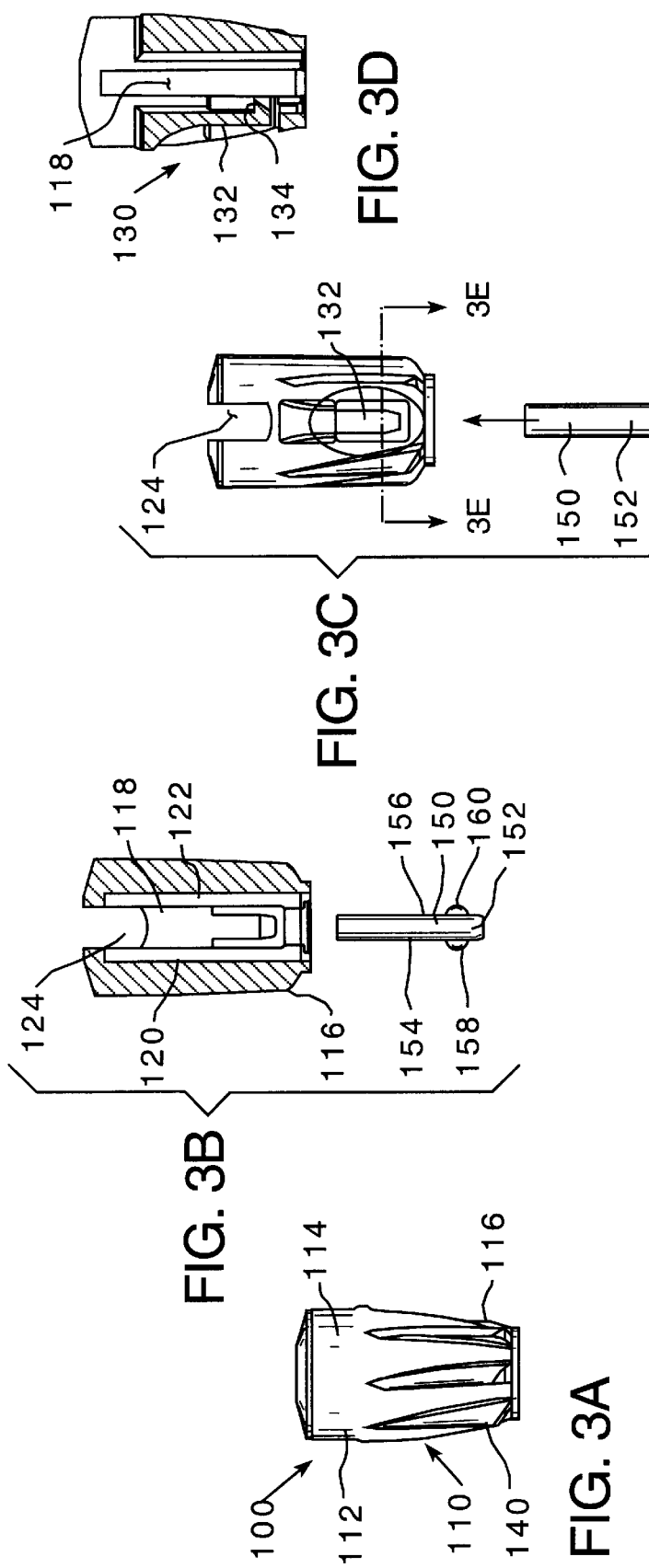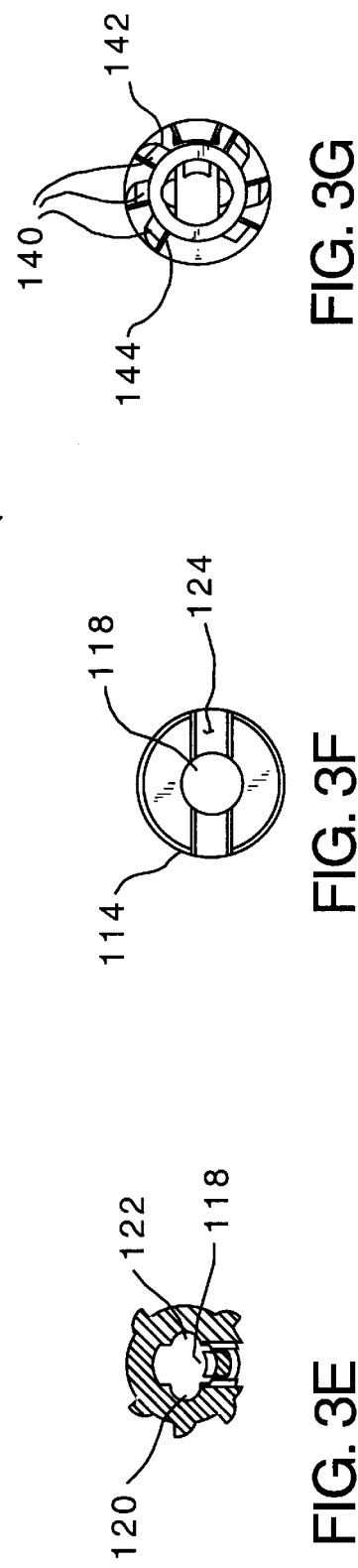

KNOB FOR A POST VALVE

BACKGROUND OF THE INVENTION

1. Field of the Invention

This invention relates to knobs for post valves and, more specifically, to a knob which provides three methods of operating the post valve.

2. Description of the Prior Art

Pressurized gas cylinders, such as those used for medical purposes, include a post valve for controlling the flow of gas. The post valve includes a threaded end, a body, and a threaded stem. The threaded end is coupled to the compressed gas cylinder. The body is typically rectangular and includes an outlet. The stem includes a threaded portion and an exposed portion. The exposed portion includes flats shaped to be engaged by a wrench or other device. The stem threaded portion is threaded into the body and rotates to open and close the valve. Around the stem is a bonnet. The bonnet is also threaded into the body, at a different location from the stem, and prevents the stem from disconnecting with the body.

The body includes an internal passage that allows fluid communication between the threaded end and the outlet. Typically, the outlet is a passage that extends in a direction generally perpendicular to the internal passage. A landing is disposed between the internal passage and the outlet. The landing has a surface that extends in a direction generally perpendicular to the internal passage. The stem travels in a direction generally parallel to the internal passage and generally perpendicular to the outlet passage. The stem is structured to contact the landing. When the stem is contacting the landing, gas can not flow through the passage and the valve, therefore, it is closed. When the stem is spaced from the landing, the valve is open. When the stem is rotated one direction, typically counterclockwise, the stem moves away from the landing. Rotating the stem clockwise will moves towards and contacts the landing.

Thus, the valve may be opened by rotating the stem in one direction, typically counterclockwise. The valve may be closed by rotating the stem in the opposite direction, typically clockwise.

For medical applications, a compressed gas cylinder will typically utilize a yoke. The yoke includes a body having a medial opening sized to fit around the valve body, that is, a rectangular opening. The yoke also includes a T-handle screw to secure the yoke to the post valve. The yoke further includes an conduit. The yoke conduit is in fluid communication with the post value outlet. The yoke conduit includes an externally threaded attachment end that may be coupled to a hose or other device.

Early post valves included a wrench that was sized to fit flat portions on the external portion of the stem. To open or close the valve, the user placed the wrench on the stem and rotated the wrench. This design had the advantage of a top that was narrower than the valve body. Thus, the yoke could be easily installed over the post valve. The disadvantage was that the valve required an extra tool in order to open or close the valve. This design also allowed industrial users, e.g., those who filled the cylinder with the compressed gas, to use a tool, such as a modified socket wrench to open and close the valve quickly.

A second embodiment of a post valve included a winged knob that was coupled to the exposed stem. The winged knob eliminated the need for a separate tool; however, the knob made it difficult to place the yoke on the stem valve. Additionally, the size of the winged knob was limited to the size of the medial opening on the yoke. Because the size of the winged knob was limited, the knob sometimes did not provide enough leverage for older or infirm patients to operate the valve. Additionally, the winged knob prevented the industrial users from using a socket wrenches to open the valve.

Another embodiment of post valves incorporated a winged knob having an extended stem. Thus, the valve could still be opened by hand while having an exposed stem which could be turned with a wrench or a socket wrench. These valves were, however, longer than prior stem valves and cost more to manufacture. Additionally, it was still difficult to install a yoke over the winged knob.

Another type of post valve incorporated a pivoting handle. The pivoting handle was narrower than the valve body. The handle included a slotted end that straddled the stem. A pin pivotally coupled the handle to the stem. To install a yoke, a user pivoted the handle to be generally parallel to the axis of the post valve. To use the handle, the handle was pivoted to be generally perpendicular to the axis of the post valve. Thus, in one position, the handle did not interfere with installation of the yoke. In the other position, the handle provided leverage for rotating the stem. Moreover, because the handle could be aligned with the post valve, the handle could be of any length. When a longer handle was used, a greater lever arm was created making operation of the valve easier for the infirm. Because the handle is coupled to the stem, however, an industrial user cannot use a wrench to operate the valve.

There is, therefore, a need for a post valve knob that allows a yoke to be installed easily, while allowing for operation of the valve with or without a wrench, and that provides greater leverage so that the valve may be operated by the infirm.

There is a further need for such a post valve knob that can be mounted on existing post valves.

SUMMARY OF THE INVENTION

These needs, and others, are satisfied by the invention which provides a knob having an elongated body with a collapsible handle. The knob body includes a cavity extending along the axis of the body. A first end of the body includes a slot extending perpendicular to the body axis. The handle has a cross-sectional size and shape of a valve stem. The handle is structured to move between a first position and a second position. In the first position, the handle is substantially disposed within the cavity. As such, the handle extends in a direction generally parallel to the axis of the knob. In this position, a yoke may be easily installed. Additionally, the exposed end of the handle has the same general dimensions as a valve stem. Thus, the handle may be manipulated by a wrench. In the second position the handle is disposed within the first end slot. Thus, the handle extends perpendicularly to the axis of the post valve. In this position, the handle provides a lever with a sufficient length to make operation of the valve more convenient to the infirm.

Accordingly, it is an object of this invention to provide a knob for a medical post valve having a handle with two positions allowing three modes of operation. The first handle position, a retracted position, allows the knob to be turned by hand or by a wrench. With the handle in the second, extended position, the handle acts as a lever and the knob can be turned easily using the extended handle.

BRIEF DESCRIPTION OF THE DRAWINGS

A full understanding of the invention can be gained from the following description of the preferred embodiments when read in conjunction with the accompanying drawings in which:

FIGS. 3A–3G are views of the knob. More specifically, FIG. 3A is a side view of the knob.

FIG. 3B is a second side view with the knob rotated 90 degrees as compared to FIG. 3A and showing the handle.

FIG. 3C is a cross-sectional side view of the knob.

FIG. 3D is a cross-sectional side view of the knob with the knob rotated 90 degrees as compared to FIG. 3C.

FIG. 3E is a cross-sectional top view taken along line 3E—3E of FIG. 3B.

FIG. 3F is a top view of the knob.

FIG. 3G is a bottom view of the knob.

DETAILED DESCRIPTION OF THE PREFERRED EMBODIMENT

Figures 1, 2:
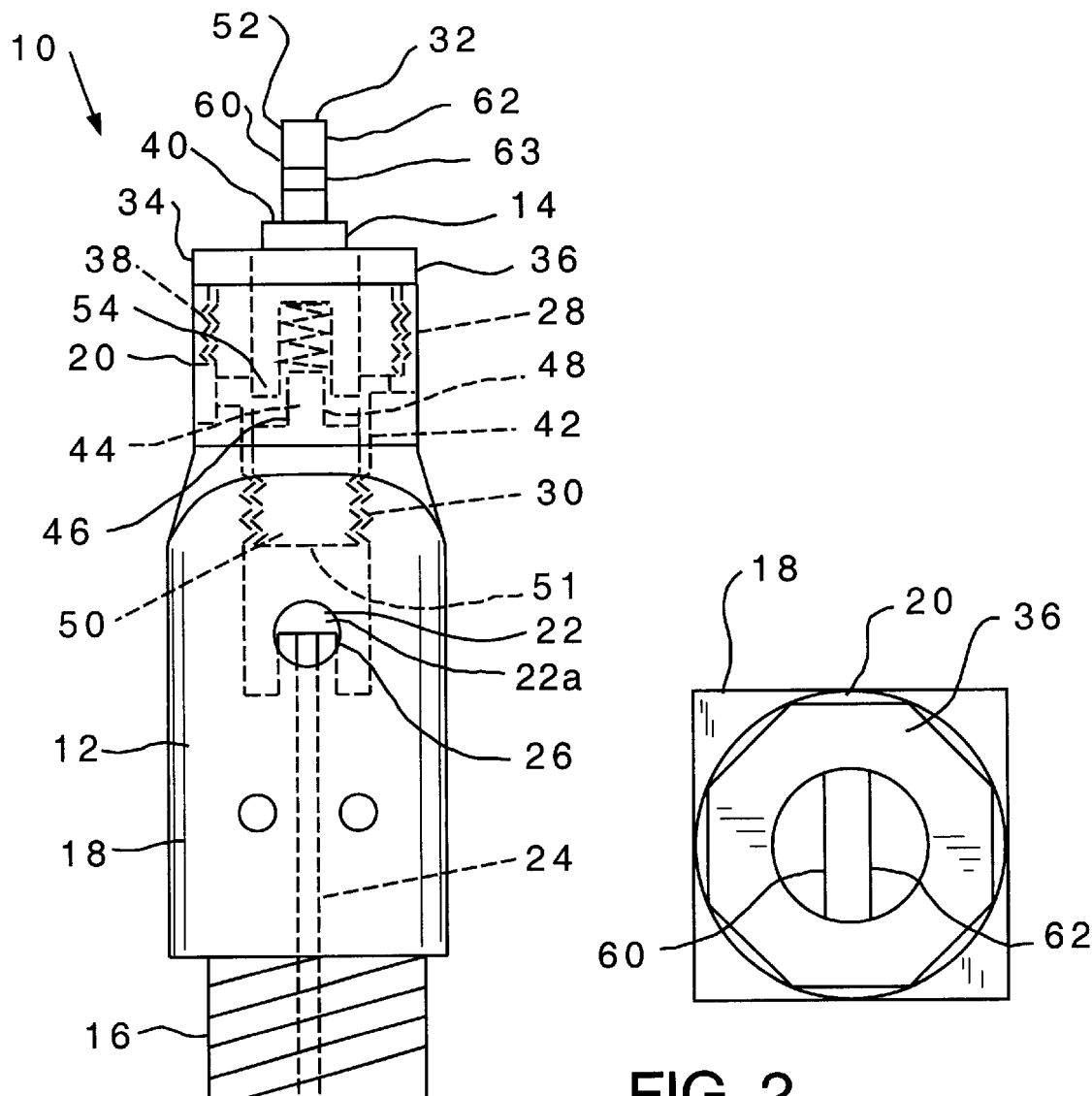
FIG. 1 is an elevation view of a prior art post valve.
FIG. 2 is a top view of a prior art post valve.

As shown in FIG. 1, a post valve 10 includes a body 12, and a valve assembly 14. The elongated body 12 includes a threaded attachment end 16, a generally square portion 18, and a generally cylindrical portion 20. The attachment end 16 is structured to engage a compressed gas cylinder (not shown). The generally square portion 18 includes an outlet 22 which is an outlet passage 22a extending in a direction perpendicular to the axis of the body 12. An internal passage 24 extends generally along the axis of body 12 between the attachment end 16 and the outlet passage 22a. Within outlet passage 22a is a generally flat landing 26 extending in a plane perpendicular to the axis of body 12.

The cylindrical portion 20 includes two sets of internal threads, an upper set and a lower set 28, 30, both extending generally axially. The lower set of threads 30 extends from the cylindrical portion 20 into the generally square portion 18, adjacent to the landing 26. The upper set of threads 28 extends from the lower set of threads 30 to the distal end of the cylindrical portion 20.

The valve assembly 14 includes a stem assembly 32 and a bonnet 34. The bonnet 34 includes a central bore, a hexagonal portion (FIG. 2) 36 and a threaded portion 38. The bonnet threaded portion 38 is structured to engage the body upper threaded portion 28. The stem assembly 32 includes an upper stem segment 40 and a lower stem segment 42. The lower stem segment 42 includes an upper tab 44. The upper tab 44 has two generally flat sides 46, 48. The lower stem segment 42 also has a threaded portion 50. The lower segment threaded portion 50 is structured to engage body lower threaded portion 30. The lower stem segment 42 also includes a generally flat sealing surface 51. The sealing surface 51 is structured to engage landing 22. The upper stem segment 40 is generally cylindrical having an exposed, upper end 52 and a slotted lower end 54. The slotted lower end 54 is sized to correspond to lower segment tab 44. That is, the lower segment tab 44 fits within the upper segment slot 54. The exposed end 52 includes two generally flat portions 60, 62. The exposed end 52 also has a cutout 63. The cutout 63 forms a flat surface on the exposed end 52 which is generally perpendicular to the axis of the post valve 10.

When assembled, the post valve 10 includes the lower stem segment 42 threaded into body lower threaded portion 30, bonnet 36 threaded into body upper threaded portion 28, and upper stem segment 40 disposed in bonnet bore and with slotted lower end 54 engaging lower segment upper tab 44. Thus, rotation of the upper segment 40 will affect a rotation in the lower segment 42 and cause the lower segment 42 to move into and out of engagement with landing 22 thereby opening or closing the post valve 10. The exposed flat surfaces 60, 62 of the upper stem segment 40 may be conveniently grasped by a wrench.

The invention is a knob 100 shown in FIGS. 3A–3G structured to engage the post valve 10 shown in FIGS. 1 and 2. The knob 100 includes a hub 110 and a handle 150. The hub 110 includes a generally cylindrical elongated body 112. Preferably, the body 112 has a diameter that is generally the same diameter as the post valve cylindrical portion 20. The body 112 has an first, upper end 114 and a second, lower end 116. As shown best in FIGS. 3B and 3E, body 112 includes a central cavity 118. The cavity 118 extends from the body second end 116 substantially, but not entirely through, body first end 114. The cavity 118 includes two opposing channels 120, 122 which extend radially from the cavity 118. As shown best in FIGS. 3C and 3F, the body first end 114 includes a radial slot 124 that extends across the body first end 114. That is, the slot 124 extends in a plane generally perpendicular to the axis of body 112. The slot 124 communicates with cavity 118.

As best shown in FIG. 3D, the knob 100 includes an attachment means 130. In the preferred embodiment the attachment means 130 is one or more leaf springs 132 having a flange 134 (only one leaf spring is shown in FIGS. 3B, 3C, and 3D). The flange 134 is structured to engage the post valve upper end cut out 63. Additionally, the body second end 116 is sized to snugly engage the exposed end 52 as described below.

The body second end 116 includes a plurality of external ribs 140. The ribs 140 have an arcuate side 142 and a flat side 144. The flat side 144 extends generally radially from the axis of the hub 110 at an acute angle. The arcuate side 142 extends to the clockwise side of the flat side 144 when viewing the hub 110 from the bottom, as shown in FIG. 3G. With the ribs 140 having this configuration, the user will apply pressure to the arcuate side 142 when closing the valve assembly 14 and apply pressure to the flat side 144 when opening the valve 14. As the user's grip will be less firm on the arcuate sides 142, the ribs 140 aid in preventing the user from over-tightening the valve assembly 14. Conversely, the flat side 144 provides the user with an edge that may be easily gripped when opening the valve assembly 14.

As shown in FIG. 3B, the handle 150 includes an elongated body 152 having two flat sides 154, 156. At one end of the handle body 152, a protuberance 158, 160 extends from each flat side, 154, 156. The elongated body 152 is sized so that the end opposite the protuberances 158, 160 is generally the same size and shape as the valve stem exposed end 52. The protuberances 158, 160 are sized to extend into the channels 120, 122 when .the handle 150 is disposed within the cavity 118.

Figure 4:
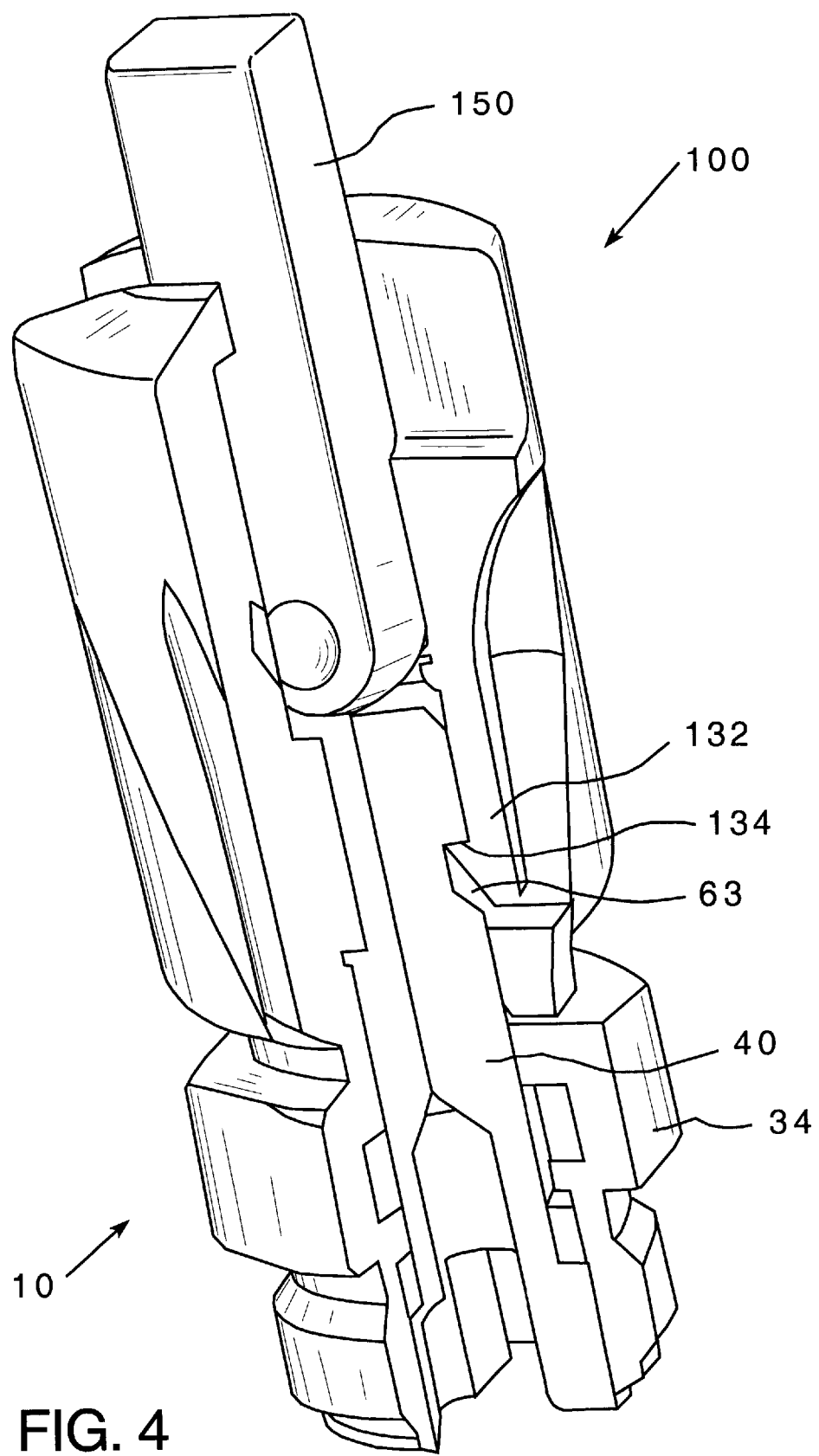
FIG. 4 is an isometric cut-away view of the knob on a post valve in the first position.

When the knob is assembled, as shown in FIG. 4, the handle 150 is disposed within cavity 118 thereby forming a coupling. The protuberances 158, 160 are disposed in channels 120, 122 respectively. Additionally, the knob 100 is attached to post valve 10. The stem exposed end 52 extends partially into cavity 118 from the body second end 116. The leaf spring 132 and flange 134 engage cut out 63 preventing the knob 100 from being removed from the post valve 10 in an axial direction. By extending into the cavity 118, the exposed end 52 also traps the handle 150 in the cavity 118.

The handle 150 may move between a first position and a second position. In the first position the handle 150 is disposed axially in the cavity 118 with the protuberances 158, 160 adjacent to the exposed end 52. The end of the handle 150 opposite the protuberances 158, 160 extends generally axially beyond body first end 114. Thus, the end of the handle 150 opposite the protuberances 158, 160 may be engaged by a wrench. With the handle 150 in the first position, the knob 100 may also be turned by grasping the ribs 140 and rotating the knob 100.

Figure 5:
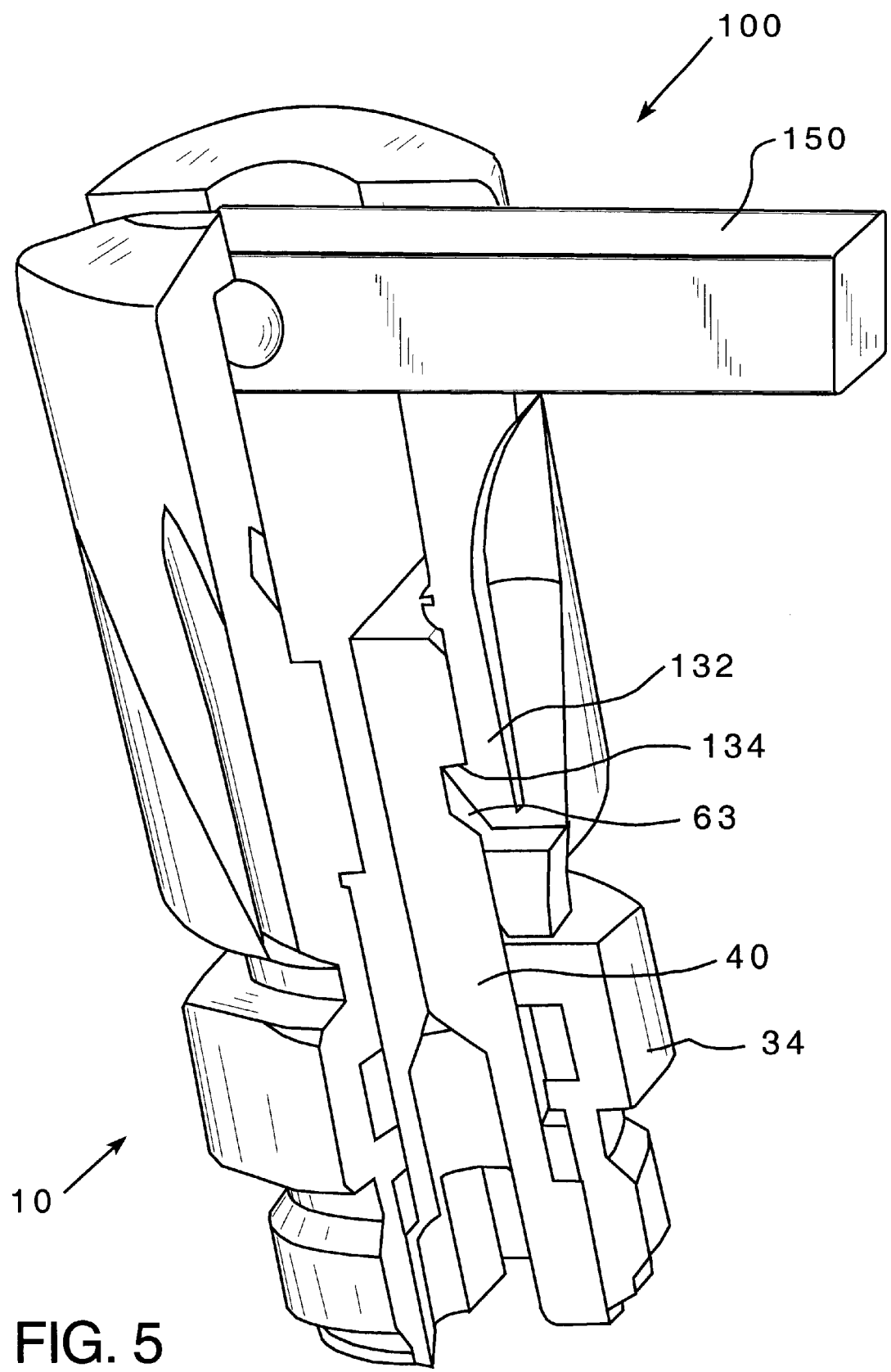
FIG. 5 is an isometric view of the knob in the second position.

As shown in FIG. 5, the handle may be moved into the second position. In the second position, the handle has been moved axially away from the exposed end 52 until the protuberances 158, 160 have contacted the upper end of the channels 120, 122 adjacent to the first end 114. At this point, the handle 150 pivots about the protuberances 158, 160 until the handle 150 extends along the slot 124. Thus, the handle 150 extends generally radially from the hub 112. In the second position, the handle 150 provides leverage to assist in turning the knob 100.

Thus, the present invention provides three modes of operation. With the handle 150 in the first, retracted position, the knob 100 may be turned by hand or by a wrench. With the handle 150 in the second, extended position, the knob 100 can be turned easily using the extended handle 150.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A knob for a medical post valve, said post valve having a cylindrical portion with a diameter, and a valve stem, said valve stem having an exposed end shaped, generally, as a cylinder with two opposing flat sides, said knob comprising:
   a hub having an elongated, generally cylindrical body with a diameter that is generally the same size as said valve cylindrical portion diameter;
   said hub body having a first end, a second end, and an axial cavity;
   said first end having a slot extending in a radial direction across said first end;
   a handle having an elongated body;
   said handle body sized to fit within said cavity;
   said handle movable between a first position and a second position;
   said handle first position being disposed within such cavity with the axis of said handle generally aligned with the axis of said body; and
   said handle second position being disposed within said slot with the axis of said handle extending perpendicular to the axis of said body.

2. The knob for a medical post valve of claim 1, wherein said hub body and said handle form a coupling comprising two channels disposed on opposite sides of said hub body cavity and extending into said first end slot and two protuberances disposed on opposite sides, and at one end of, said handle body and each protuberance structured to engage one said channel.

3. The knob for a medical post valve of claim 2, wherein said channels extend from said second end into said slot.

4. The knob for a medical post valve of claim 3 wherein said hub body second end is structured to engage said stem external end.

5. The knob for a medical post valve of claim 4, wherein said hub body second end includes a plurality of ribs extending outwardly.

6. The knob for a medical post valve of claim 5, wherein:
   each said rib includes a flat side and a curved side; and
   said flat side extending from said hub body at an acute angle.

7. The knob for a medical post valve of claim 6, wherein said stem exposed end includes at least one undercut and wherein:
   said knob second end includes at least one leaf spring having a flange; and
   an end of said flange structured to engage said at least one undercut.

8. The knob for a medical post valve of claim 6, wherein said handle body end opposite said handle body end with said protuberances is structured to have a shape similar to said stem exposed end.

9. The knob for a medical post valve of claim 2, wherein said handle body end opposite said handle body end with said protuberances is structured to have a shape similar to said stem exposed end.

10. The knob for a medical post valve of claim 2, wherein said handle is structured to move between said first position and said second position by pivoting about said protuberances when said protuberances are located adjacent to said first end.

11. A medical post valve comprising:
   a body having a cylindrical portion with a diameter;
   a valve stem coupled to said body and having an exposed end;
   said exposed end shaped, generally, as a cylinder with two opposing flat sides;
   a knob comprising:
      a hub having an elongated, generally cylindrical body with a diameter that is generally the same size as said valve cylindrical portion diameter;
      said hub body having a first end, a second end, and an axial cavity;
      said first end having a slot extending in a radial direction across said first end;
      a handle having an elongated body;
      said handle body sized to fit within said cavity;
      said handle movable between a first position and a second position;
      said handle first position being disposed within such cavity with the axis of said handle generally aligned with the axis of said body; and
      said handle second position being disposed within said slot with the axis of said handle extending perpendicular to the axis of said body.

12. The medical post valve of claim 11, wherein said hub body and said handle form a coupling comprising two channels disposed on opposite sides of said hub body cavity and extending into said first end slot and two protuberances disposed on opposite sides, and at one end of, said handle body and each protuberance structured to engage one said channel.

13. The knob for a medical post valve of claim 12, wherein said channels extend from said second end into said slot.

14. The knob for a medical post valve of claim 13 wherein said hub body second end is structured to engage said stem external end.

15. The knob for a medical post valve of claim 14, wherein said hub body second end includes a plurality of ribs extending outwardly.

16. The knob for a medical post valve of claim 15, wherein:
   each said rib includes a flat side and a curved side; and
   said flat side extending from said hub body at an acute angle.

17. The knob for a medical post valve of claim 16, wherein:
   said stem exposed end includes at least one undercut;
   said knob second end includes at least on leaf spring having a flange; and
   an end of said flange structured to engage said at least one undercut.

18. The knob for a medical post valve of claim 16, wherein said handle body end opposite said handle body end with said protuberances is structured to have a shape similar to said stem exposed end.

19. The knob for a medical post valve of claim 12, wherein said handle body end opposite said handle body end with said protuberances is structured to have a shape similar to said stem exposed end.

20. The knob for a medical post valve of claim 12, wherein said handle is structured to move between said first position and said second position by pivoting about said protuberances when said protuberances are located adjacent to said first end.

* * * * *

UNITED STATES PATENT AND TRADEMARK OFFICE
CERTIFICATE OF CORRECTION

PATENT NO. : 6,473,940 B1
DATED : November 5, 2002
INVENTOR(S) : Devin Glenn Cooper It is certified that error appears in the above-identified patent and that said Letters Patent is hereby corrected as shown below:

Column 7,
Line 12, "on" should read -- one --.

Signed and Sealed this

Twenty-fifth Day of February, 2003

JAMES E. ROGAN
*Director of the United States Patent and Trademark Office*